March 2, 1965    A. D. FORSBERG ETAL    3,171,616
ATTITUDE CONTROL APPARATUS FOR AIRCRAFT
Filed Dec. 27, 1960
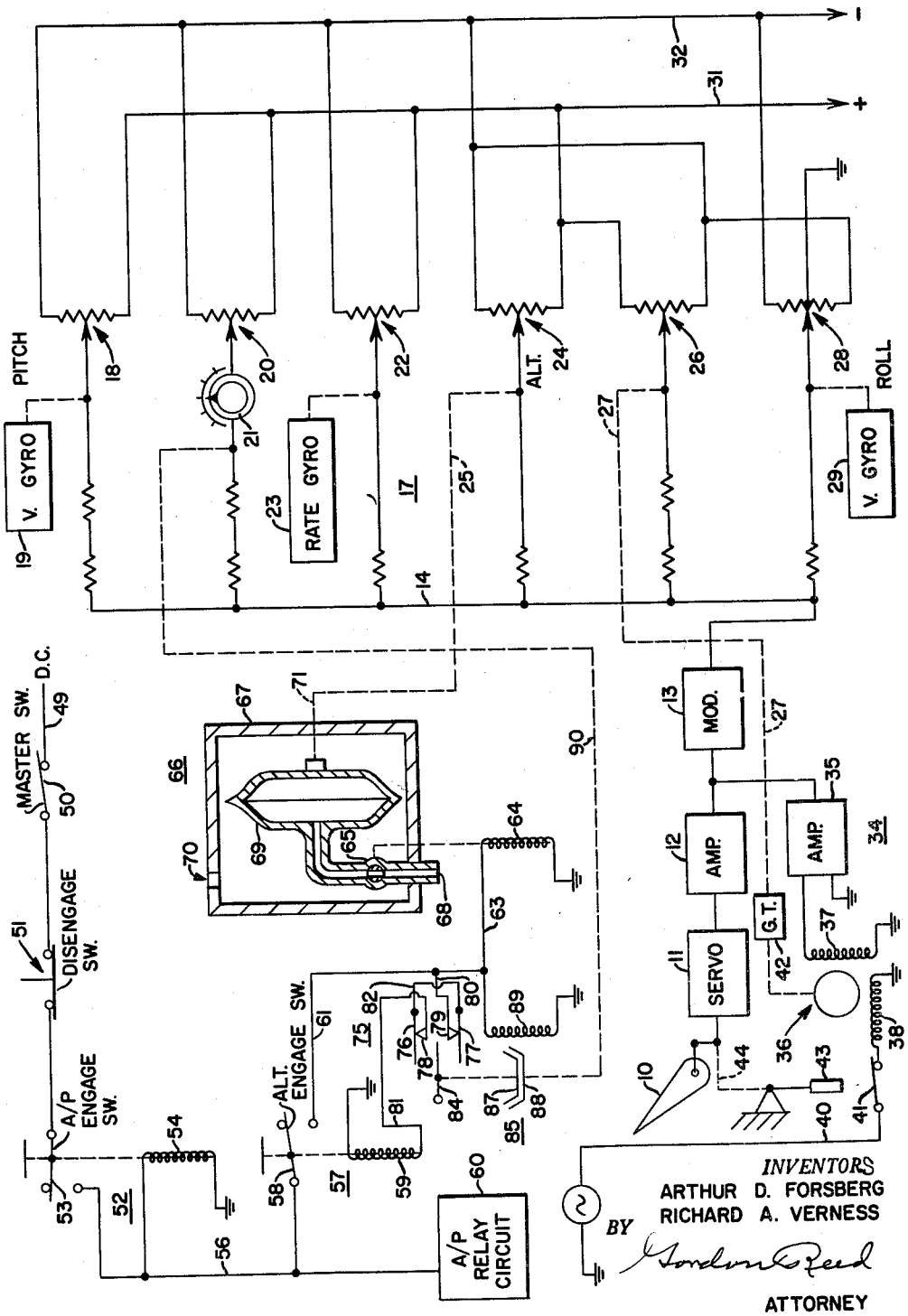
INVENTORS
ARTHUR D. FORSBERG
RICHARD A. VERNESS
BY
Gordon Reed
ATTORNEY United States Patent Office 3,171,616
Patented Mar. 2, 1965

3,171,616
ATTITUDE CONTROL APPARATUS FOR AIRCRAFT
Arthur D. Forsberg, Forest Lake, and Richard A. Verness, Minneapolis, Minn., assignors to Honeywell Inc., a corporation of Delaware
Filed Dec. 27, 1960, Ser. No. 78,750
12 Claims. (Cl. 244—77)

This invention relates to improvements in automatic control apparatus such as automatic pilot systems for aircraft. An automatic pilot system may operate attitude changing means of the craft such as a control surface with the surface alternatively being directly manually operated. The invention in more particular pertains to an automatic pilot system having a trim control for altering attitude and an automatic flight path control for maintaining a flight condition and wherein following introduction of the flight path control and subsequent operation of the trim control, the flight path control is automatically disabled.

In an aircraft equipped with an automatic pilot of the type to be described, the pilot may select a preengaged mode, an attitude hold mode, or a flight path control mode. During the disengaged mode, the pilot of the aircraft may manually operate attitude changing means of the craft to place it in various attitudes, and the automatic pilot meanwhile will be automatically or manually synchronized to the attitude assumed by the aircraft. In the attitude hold mode, an attitude responsive device along with an attitude selector or trim device may determine the attitude to be automatically maintained. In the flight path mode when the flight path contemplated may be either that derived from an altitude sensor, radio beam devices, or similar means, the aircraft will be guided to and thereafter maintain a position dictated by the flight path sensor.

In the event that the autopilot trim control be operated while the flight path mode is in effect, any command initiated from operation of the trim means tending to change attitude and deviate from the flight path maintained is resisted by the flight path sensor. An extreme deviation would have an unwanted effect on the flight path sensor such as an undesired pitch up or down.

An object of this invention is to insure that a flight path sensor of the automatic pilot is rendered ineffective upon operation of a trim control of the automatic pilot.

A further object of the invention is to render a flight path sensor for an automatic pilot ineffective as soon as a predetermined displacement of a trim control device occurs during the flight path control mode of an automatic pilot.

A further object of the invention is to provide in an automatic pilot a trim control device which may assume any of a number of selected positions during a pilot operated mode of an automatic pilot but during a flight path mode of the automatic pilot any predetermined operation of the trim device will render the flight path sensor ineffective on the automatic pilot.

A further object of this invention is to provide an automatic pitch axis control for an aircraft wherein said control includes a manually operable trim control device for selecting the operating point of the control system and wherein thereafter altitude control may be introduced which is however automatically disabled upon subsequent operation of the trim device a small predetermined extent.

The above objects and other novel features of this invention may be more readily understood with reference to the following description and accompanying drawing of a preferred embodiment of the invention.

In the drawing, the single figure discloses an electric schematic of the trim adjusting-altitude control disabling device.

Referring to the drawing, the invention is shown as being applied to an automatic pilot for an aircraft which controls the pitch attitude of an aircraft through operation of attitude changing means such as an elevator surface 10. The pitch control surface 10 is operated from a servo 11 which may be of the hydraulic type which in turn is controlled from an amplifier 12. The amplifier 12 may be of the A.C. discriminator type and is supplied with A.C. control signal voltages derived from a D.C. to A.C. modulator 13 connected to a signal summing conductor 14 of a balanceable D.C. signal network 17. Depending upon the phase or polarity of the signal voltage on summing conductor 14, the servomotor 11 will position the control surface 10 in one direction or another.

The network 17 is illustrated as a parallel summing multiple D.C. control signal summing arrangement. Multiple signals are supplied from various sources comprising a pitch attitude signal potentiometer 18, a trim signal providing means for signal potentiometer 20, a pitch rate signal potentiometer 22, an altitude displacement signal potentiometer 24, a synchronizing potentiometer 26, and an up-elevator potentiometer arrangement 28. The potentiometer 18 is operated from a vertical gyroscope 19 in accordance with the pitch attitude of the aircraft. The potentiometer 20 is operated from a manually operable trim knob 21. The potentiometer 22 is operated from a rate gyroscope 23 responsive to pitch rate of the aircraft. The potentiometer 24 is operated through a suitable operating means 25 extending from an altitude sensor 66, to be described. Potentiometer 26 is operated from a synchronizer motor arrangement 34, and potentiometer 28 is operated from a vertical gyroscope 29 in accordance with the roll attitude of the aircraft.

The potentiometers are conventionally energized from D.C. supply conductors 31, 32 extending to a suitable D.C. supply (not shown).

During what may be considered a pre-engaged mode for the automatic pilot system, the A.C. output of modulator 13 is supplied to a discriminator amplifier 35 in the synchronizer arrangement 34. The amplifier output is supplied to an amplifier phase winding 37 of an induction motor 36 which has its other winding 38 connected through switch 41 when closed to an A.C. energized conductor 40. Energization of the motor 36 and its consequent rotation is transmitted through gear train 42 and operating transmission means 27 to the attitude displacement error potentiometer 26. During such pre-engaged mode, the control surface 10 may be manually operated through suitable operating means such as a control stick 43 connected through motion transmitting means 44 to the elevator surface 10. During changes of aircraft attitude incurred through the operation of the manually operable means 43 any signal unbalance in summing conductor 14 results in the operation of the synchronizer arrangement 34 which drives the potentiometer 26 to rebalance the network 17 and null the signal on conductor 14.

During the transition to the engage mode or attitude hold mode, when the automatic pilot controls elevator 10, D.C. power voltage from a supply conductor 49 passes through a master switch 50, a normally closed momentarily opened disengage switch 51, an autopilot engage switch 52, conductor 56, to an autopilot relay circuit 60. The operation of the relay circuit 60 in well-known manner conditions or prepares the servomotor 11 to operate the surface 10 by supplying pressure fluid thereto. The autopilot engage switch 52 is of the manually closed solenoid held type and comprises a manually operable switch arm 53 and a solenoid hold arrangement 54 for maintaining the switch in closed position after manual operation. Thus, upon manual operation of switch 52 in a manner well known in the art to a closed circuit position, and with the opening of switch 41, the attitude of the aircraft is maintained by vertical gyroscope 19 through the automatic pilot in accordance with the attitude of the aircraft attained upon operation of switch 52.

An outer loop or flight path control in the form of altitude hold may be applied to the network 17 by operation of an altitude engage switch 57 which is also of the manually closed-solenoid held type similar to switch 52. Closing of switch 57 at this time completes a circuit through conductor 61, conductor 63 and valve operating solenoid 64 which effects the closing of a valve 65 of altitude sensor 66.

The altitude sensor 66 may be of the trapped air type and comprises a casing 67 supporting therein a diaphragm 69 of the resilient expansible type. Pressure to the interior of diaphragm 69 is supplied through previously open valve 65 from a static pressure supply line 68 connected to the atmosphere. The interior of casing 67 and therefor the exterior of diaphragm 69 receive static pressure through an opening 70 in casing 67. With the valve 65 in open position, no differential pressure exists on the diaphragm 69 since equal pressures are applied to the interior and exterior thereof. However, upon closing of valve 65 at a selected altitude to be maintained by the aircraft and upon any changes in altitude of the craft therefrom, a differential pressure exists on diaphragm 69 causing movement of the output member 71 which is connected through operating transmission means 25 to the altitude displacement error potentiometer 24. Upon any subsequent reopening of valve 65, the resiliency in diaphragm 69 and the equalities in its interior and exterior pressures causes the potentiometer 24 to be recentered or returned to the condition existing at the closing of switch 57 thereby rendering potentiometer 24 ineffective.

Coming now to the details which coact in a novel manner with the above altitude control apparatus, for disengaging altitude control there is associated with the holding solenoid 59 of switch 57 a switching arrangement 75 of the positively opened-self closing type. This switching arrangement comprises two resilient operable arms 76, 77 with their respective coacting contacts 78, 79. An energizing circuit for holding solenoid winding 59 is provided with switch 57 closed and extends from energized conductor 61, conductor 80, switch contact 79, switch arm 77, conductor 82, switch arm 76, switch contact 78, conductor 81, solenoid winding 59, and thence to ground. Operatively associated with the altitude disengage control switch arms 76, 77 is an altitude disengage switch operating means 84. The switch operating means 84 is carried by a driven clutch member 87 and is connected through a magnetic clutch 85 when closed, and motion transmission means 90 to the operable trim knob 21. The clutch 85 includes drive element 88 along with driven element 87 operatively connected to switch operating means 84. The solenoid clutch 85 is operated by magnetic clutch winding 89 which is energized upon the closing of the altitude engage switch 57 being in parallel electrically with the winding 64 that effects closing of valve 65 of altitude controller 66.

Upon subsequent operation of the trim knob 21 following closing of the altitude engage switch 57 such operation of the trim knob 21 is transmitted through means 90 and clutch 85 to the switch arm 84 to displace it. The switch arm 84 and the switching arrangement 75 are shown for clarity in the drawing at right angles to their normal operative position in the apparatus. The switch operating means 84 is positioned intermediate switch arms 76, 77 and may be displaced to engage switch arm 76 when trim knob 21 is rotated in one direction and is displaced to engage switch arm 77 if trim knob 21 is rotated in the opposite direction. Upon engagement of operating arm 84 with either switch arm 76, 77 the circuit through altitude engage switch solenoid hold winding 59 is opened, and the altitude engage switch arm 58 automatically moves to open position. This opening of switch 57 opens the circuit through magnetic clutch winding 89 and valve operating solenoid winding 64 rendering the altitude sensor 67 ineffective on network 17 and also as conventional opening clutch 85. There is sufficient resiliency in either of the switch arms 76, 77 if operated to disengage its contact, so that upon opening of the clutch 85, the respective switch arm 76 or 77 will return to engagement with its respective contact 78 or 79 depending upon which switch arm has been displaced against the opposition of switch operator 84.

Summarizing the operation, in the pre-engaged mode when the aircraft attitude changing means 10 is being directly manually positioned from control stick 43, the engage switch 52 is in open position as shown and switch 41 is closed. Any unbalance in D.C. summing network 17 derived from operation of gyro 19 or other causes of unbalance in network 17 are rebalanced by operation of the synchronizing arrangement 34.

In the attitude hold or automatic pilot engaged mode, switch 52 is in closed position and held therein by solenoid holding means 54 and switch 41 is in an opened position. In the attitude hold mode with the automatic pilot engaged, the aircraft attitude is maintained by operation of the vertical gyro 19.

While in the engaged mode, flight path control may be introduced by operation of the altitude engage switch 57 which energizes solenoid 64 of valve 65 trapping air within diaphragm 69 at a given pressure. Any changes in exterior pressure on diaphragm 69 from that existing at the closing of valve 65 will result in operation of potentiometer 24 to develop an altitude control signal which restores the aircraft so that pressures on the diaphragm 69 are equalized. At the same time that valve 65 is moved to the closed position, clutch operating winding 89 is energized to operatively connect the switch operating means 84 to the trim knob 21. Upon operation of trim knob 21 subsequent to the introduction of altitude hold by closing of switch 57, the switch operating means 84 will be moved or displaced through a predetermined distance depending on the spacing of operator 84 and arms 76, 77 usually very small to operate one or the other of switch arms 76, 77 to open the circuit through the altitude engage switch holding solenoid winding 59 thereby opening switch 57. Opening switch 57 opens the circuit through valve operating winding 64 resulting in the valve 65 automatically moving to open position. Opening switch 57 also causes the deenergization of clutch operating winding 89 separating the clutch elements 87, 88 and causing the operated switch arms 76 and 77 to re-engage its coacting contact.

After such subsequent operation of trim knob 21, the altitude engage switch 57 may be operated again to restore altitude hold by closing valve 65. Preferably there is no significant spacing between operator 84 and switch arms 76, 77.

Although a separate motor operated synchronizing potentiometer 26 and a separate manually operable trim potentiometer 20 have been illustrated, their functions may be combined in a single potentiometer by dispensing with potentiometer 26 and extending the operating means 27 through a slip clutch to the motion transmission means 90, the slip clutch permitting operation of the manual trim knob 21 without interference from the step down gear train 42.

It will now be apparent that there has been provided for an aircraft automatic pilot having a trim control arrangement for changing craft attitude and a constant altitude control, an interlock arrangement whereby when constant altitude has been applied to the automatic pilot any attempt to operate the trim control to alter craft attitude, wherein such trim operation involves a predetermined displacement of the trim control, and consequently cause indirectly a change in altitude, altitude control is rendered ineffective on the automatic pilot, thereby enabling the trim control through the automatic pilot to alter craft attitude without opposition from the altitude control. It will also be apparent that such rendering the altitude control ineffective is accomplished by an arrangement coupled to the trim means only after initiation of the altitude control whereby the trim means may be operated independently of the altitude control prior to altitude control introduction.

We claim:

1. In control apparatus for altering the attitude of an aircraft, in combination: attitude responsive means; balanceable means, whereby craft attitude changing means may be positioned, operated by said attitude responsive means; operable further trim means affecting the balance of said balanceable means; switch operating means; flight path maintaining means; selectively operable switching means operatively coupling said flight path maintaining means to said balanceable means and also initially coupling said switch operating means to said further trim means for subsequent operation therewith; and flight path disengaging switching means connected to the selectively operable switching means; and means operating said disengaging switching means by the switch operating means upon subsequent operation of the further trim means to operably decouple the flight path maintaining means from said balanceable means.

2. In control apparatus for a dirigible craft, in combination: attitude responsive signal providing means; further signal providing means; a flight path sensor; flight path signal providing means; selectively operable switching means enabling operation of the flight path sensor and the flight path signal providing means; switch operating means; additional means controlled by the selectively operable switching means connecting said switch operating means to said further means in any operated position thereof; means for combining the signals of the three signal providing means; and positively opened-self closing disengaging switching means controlling the selectively operable switching means and operated to open position by the switch operating means upon subsequent operation of the further means to disable operation of the flight path sensor and the flight path signal providing means.

3. In flight control apparatus for an aircraft having servo means or manually operable means operating attitude changing means of the craft to control attitude thereof, in combination: attitude responsive signal providing means; attitude command signal providing means; altitude disengage operating means; an altitude sensor; an altitude signal providing means; selectively operable means rendering the altitude sensor effective to displace the altitude signal providing means and simultaneously initially connecting said altitude disengage operating means to said attitude command means; means for combining the signals of the three signal providing means and controlling the servo means; altitude disengage control means controlling the selectively operable means; and means operating the altitude disengaging control means by the altitude disengage operating means upon subsequent operation of the attitude command means to render the altitude sensor ineffective on the altitude signal providing means to prevent the altitude sensor opposing changes in attitude derived from operation of the attitude command means.

4. In flight control apparatus for an aircraft having a control surface and servo means or manually operable means operating the same for changing craft attitude, in combination: pitch attitude signal providing means; pitch trim signal providing means normally disconnected from the trim signal providing means; switch operating means; a flight path sensor signal providing means; selectively operable means operatively connecting said switch operating means to said pitch trim means in any position thereof for subsequent movement therewith; means combining the signals of the three signal providing means and controlling said servo means; flight path disengaging switching means controlling the selectively operable means and actuated by the switch operating means upon such subsequent operation of the pitch trim means to render the flight path sensor signal providing means ineffective to control the servo means whereby trim change of the craft may be effected without opposition from the flight path sensor.

5. In flight control apparatus for a dirigible craft having attitude changing means thereon and servo means and manually operable means operating said attitude changing means, in combination: balanceable means operating said servo means; further means including motor operated synchronizing means effecting the balance of said balanceable means; switch operating means; flight path maintaining means; selectively operable switching means rendering said flight path maintaining means effective on said balanceable means, disabling said synchronizing means, and initially coupling said switch operating means to said further means for subsequent operation therewith; and flight path disengaging switching means connected to the selectively operable switching means and operated by the switch operating means upon subsequent operation of the further means to render the flight path maintaining means ineffective on said balanceable means.

6. In navigating apparatus for an aircraft, in combination: attitude sensing variable magnitude signal providing means; craft trim variable magnitude signal providing means; flight path sensing means; an additional variable magnitude signal providing means; selectively operable switching means to enable said flight path sensing means to operate said additional signal providing means; signal responsive means controlled by said three signal providing means and having an output in accordance with which the craft may be controlled; switch operating means; means now initially coupling said switch operating means to said trim signal providing means, for subsequent operation therewith, in response to operation of the selectively operable switching means; and means including a normally closed-momentarily opened disengaging switching means controlling the selectively operable switching means and temporarily moved to the open position by the switch operating means to disable the flight path sensor upon subsequent small operation of the trim signal providing means to operate said additional signal providing means.

7. In control apparatus for an aircraft having attitude changing means operated either by servo means or by manual means, in combination: attitude sensing variable signal voltage providing means; a variably positioned trim signal voltage providing means; a flight path sensor; a further variable signal voltage providing means; control means for said servo means responsive initially during variations of the signals from the first two signal providing means but subsequently responsive during variations to said three signal voltage providing means; a switch actuator; selective means rendering said flight path sensor effective on said further signal providing means for operation thereof for such subsequent response of the control means and coupling said switch actuator to said trim signal voltage providing means so that on subsequent additional positioning of the trim signal providing means said switch actuator moves through a constant additional displacement to engage the selective means to render the flight path sensor ineffective on said further signal providing means to prevent a steady state signal therefrom opposing change in trim.

8. In control apparatus for an aircraft having attitude changing means operated either by servo means or by manual means, in combination: attitude sensing variable magnitude signal providing means; a variably displaceable variable magnitude trim signal providing means; a flight path variable magnitude signal providing means; control means for said servo means responsive to variations in signals from said three signal providing means; and means selectively coupled or uncoupled to said trim signal providing means and controlling the flight path signal means so that on subsequent additional constant displacement of the trim signal providing means said flight path sensor is rendered ineffective, to enable change in trim without opposition by said flight path signal means.

9. The apparatus of claim 8, and synchronizing means responsive to said control means during manual operation of the attitude changing means to null said control means for attitude changes of the craft during such manual control.

10. In control apparatus for an aircraft having attitude changing means operated by servo means, in combination: attitude sensing signal providing means; trim signal providing means; flight path sensor signal providing means; control means for said servo means responsive to the three signals from said signal providing means; and means adapted to be selectively coupled to the trim means and effective after such above stated response of the control means to the three signal providing means but upon a further additional constant displacement of said trim signal providing means rendering said flight path sensor means ineffective to oppose change in aircraft trim.

11. In control apparatus for an aircraft, in combination: a first flight condition sensing means sensing variations thereof; operable aircraft trim means; signal means responsive to the first flight condition sensing means and aircraft trim means; a second flight condition variation sensing means; means selectively rendering said signal means also responsive to variations affecting said second flight condition sensing means; and means thereafter effective only following such selection of the signal means whereby it responds to variations in the second flight condition means and additionally on a further but constant additional extent of operation of said trim means rendering the second flight condition sensing means ineffective on said signal means, to prevent opposition to change in trim by the second flight condition sensing means.

12. In control apparatus for an aircraft having attitude changing means operated by manual or by servo means, in combination: balanceable means controlling said servo means; means including a manually operable trim means connected to the balanceable means and operated to a position to select an attitude to be maintained; flight path sensing means; selectively operable means rendering said flight path sensing means effective on said balanceable means; and means effective on subsequent further operation of said trim means from its attitude select position rendering said flight path sensing means inoperative on said balanceable means to prevent opposition to change in trim by said flight path sensing means.

References Cited by the Examiner
UNITED STATES PATENTS 2,873,418   2/59   Owen _____ 244—77
2,923,501   2/60   Seliger _____ 244—77

FERGUS S. MIDDLETON, *Primary Examiner.*

MILTON BUCHLER, *Examiner.*